DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED NOVEMBER 7, 1972

904 O.G. 5

T904,002

PRODUCTION OF CARBON BLACK FROM DISTILLATE OF RUBBER

Joseph R. Laman and Joseph A. Beckman, Akron, Ohio, assignors to The Firestone Tire & Rubber Company, Akron, Ohio

Continuation of abandoned application Ser. No. 826,303, May 8, 1969. This application July 29, 1971, Ser. No. 167,445

**Int. Cl. C09c *1/50***

U.S. Cl. 423—450

1 Sheet Drawing. 9 Pages Specification

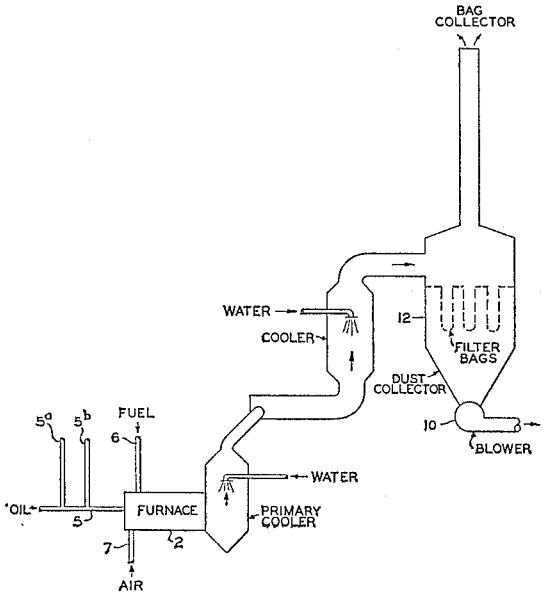

Carbon black is produced from liquid distillate obtained from the distillation of rubber. The distillation may be effected by heating the rubber externally in a suitable retort or the like, or by internal combustion of a part of the rubber with air to produce the necessary heat, limiting the air supply to minimize the conversion of the oil to gases. The distillate may be mixed with other oil before conversion to carbon black in a carbon black furnace. The furnace is heated to the desired temperature by burning either a portion of the distillate and/or fuel gas supplied to the furnace. The carbon black product can be used as semi-reinforcing black and as a filler in rubber products.

This application is a continuation of application Ser. No. 826,303, filed May 8, 1969, now abandoned.

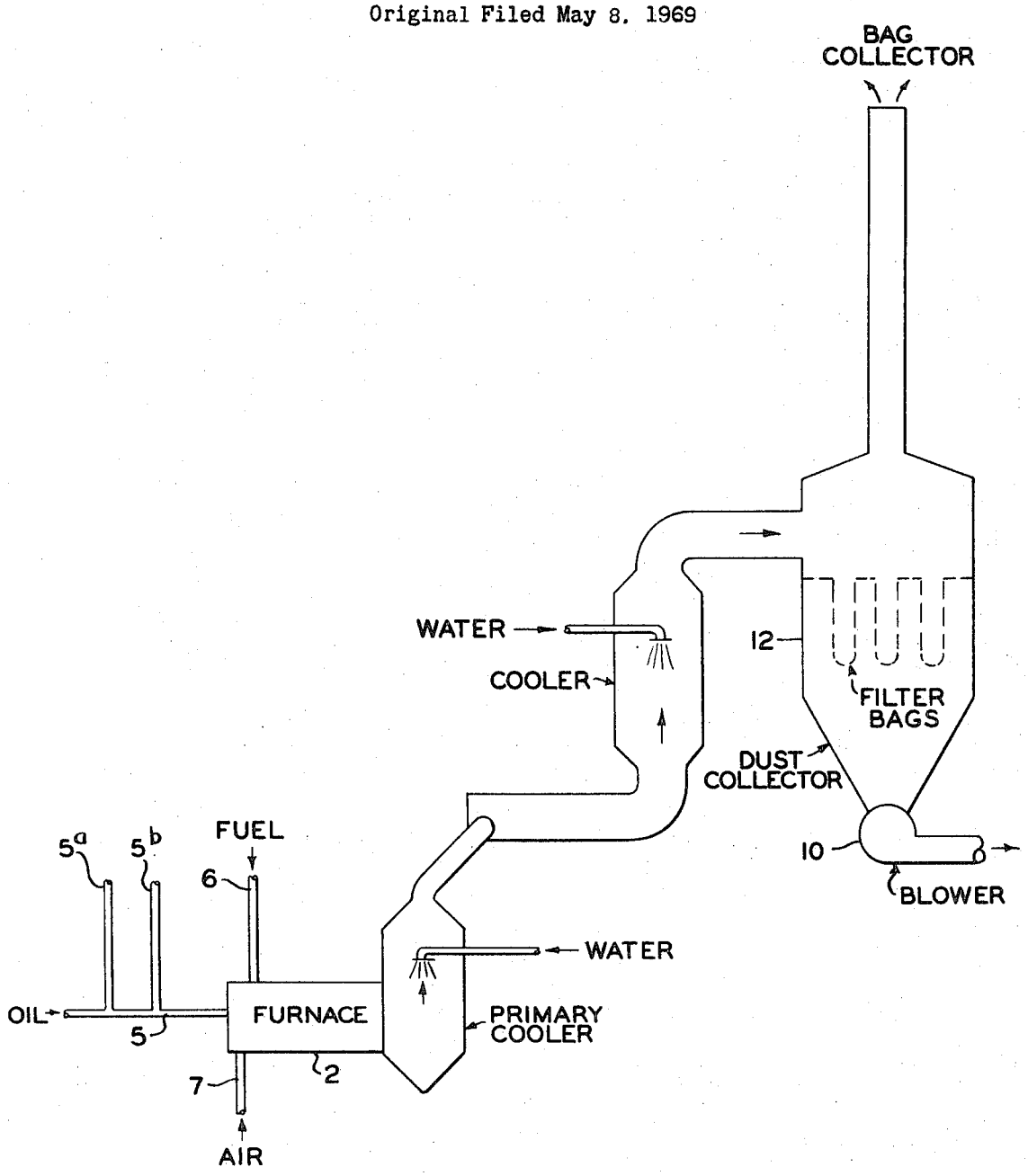

PRODUCTION OF CARBON BLACK FROM DISTILLATE OF RUBBER
Original Filed May 8, 1969